United States Patent
Cederberg et al.

[11] Patent Number: 5,921,619
[45] Date of Patent: Jul. 13, 1999

[54] AIR HANDLING SYSTEM FOR VEHICLE CAB

[75] Inventors: Russell E. Cederberg; Alan G. Leupold; Ralph D. Price, all of Plainfield, Ill.

[73] Assignee: Case Corporation, Racine, Wis.

[21] Appl. No.: 08/896,029

[22] Filed: Jul. 17, 1997

[51] Int. Cl.⁶ ................................. B60H 1/00
[52] U.S. Cl. ................................. 296/190.09; 454/136
[58] Field of Search ................ 296/190.09; 454/136, 454/137, 155

[56] References Cited

U.S. PATENT DOCUMENTS

| | | |
|---|---|---|
| 2,210,592 | 8/1940 | Lintern et al. ............ 454/136 |
| 3,868,896 | 3/1975 | Doll . |
| 4,097,085 | 6/1978 | Nelson ................ 296/190.09 |
| 4,189,987 | 2/1980 | Amberg . |
| 4,344,356 | 8/1982 | Casterton . |
| 4,365,541 | 12/1982 | Marques . |
| 4,658,598 | 4/1987 | Schulz ................... 454/136 |
| 4,721,031 | 1/1988 | Nakata . |
| 4,870,895 | 10/1989 | Mayer . |
| 4,989,500 | 2/1991 | Anliker . |
| 5,116,280 | 5/1992 | Kloster . |
| 5,248,278 | 9/1993 | Fuerst . |
| 5,342,238 | 8/1994 | Segerpalm et al. .......... 454/136 |

*Primary Examiner*—Gary C. Hoge
*Attorney, Agent, or Firm*—Foley & Lardner

[57] ABSTRACT

An air handling system for the cab of a vehicle includes a cab roof having inner and outer roof members spaced from each other so as to form a first chamber. The cab roof has a first plurality of openings around its periphery through which air may be drawn into the first chamber. The cab roof together with a headliner for the cab form a second chamber. A first opening in the inner roof member allows air to flow into the second chamber, and an air handling unit located between the headliner and the cab roof receives air from the second chamber and discharges it through a first opening in the headliner into the cab interior.

31 Claims, 3 Drawing Sheets

AIR HANDLING SYSTEM FOR VEHICLE CAB

FIELD OF THE INVENTION

The present invention relates to the ventilation of a cab of a vehicle. More particularly it relates to an air handling system which is located between the roof and the headliner of the cab. The roof and the headliner include passageways for the flow of fresh air from outside of the cab through an air handling unit and into the cab interior, and for the flow of recirculating air from the cab interior through the air handling unit and back into the cab interior.

BACKGROUND OF THE INVENTION

Work vehicles, such as tractors, equipment used in farming, and construction equipment, are often operated in adverse environmental conditions. The outside temperature may be too hot or too cold for the operator's comfort and the surrounding air may be laden with dust which results from the work being done by the vehicle. It has therefore been found desirable to provide a cab for the vehicle operator, and to filter and control the temperature of the air introduced into the cab. In providing an air handling system for this purpose, it is of course desirable that the system not only efficiently condition the air, but that it be readily incorporated in the construction of the vehicle without the use of unnecessary parts or excessive labor. Accordingly, it would be advantageous to provide an air handling system for the cab of a work vehicle, which efficiently incorporates components otherwise necessary for construction of the cab. In this manner, the need for the ducts formed from additional and separate components for use in the construction of vehicle air handling systems can be reduced or eliminated.

SUMMARY OF THE PRESENT INVENTION

An air handling system for the cab of a vehicle in accordance with the present invention is formed in part by the roof of the cab and in part by the headliner of the cab, and includes an air handling unit located between the cab roof and the headliner. More specifically, the cab roof is comprised of inner and outer roof members which are spaced from each other so as to form a first chamber therebetween. The cab roof is provided with a plurality of openings around its periphery through which fresh air may be drawn into the first chamber. A second air chamber is formed between the roof and the headliner. The inner roof member is provided with an opening through which fresh air in the first chamber may flow into the second chamber. An air handling unit, such as a heating, ventilating and air conditioning (HVAC) unit is located between the headliner and the cab roof. The air handling unit receives air from within the second chamber and discharges it through openings in the headliner into the interior of the cab. Other openings are provided in the headliner through which air may recirculate from the cab interior back into the second chamber.

Other principal features and advantages of the invention will become apparent to those skilled in the art upon review of the following drawings, the detailed description and the appended claims.

Figure 1:
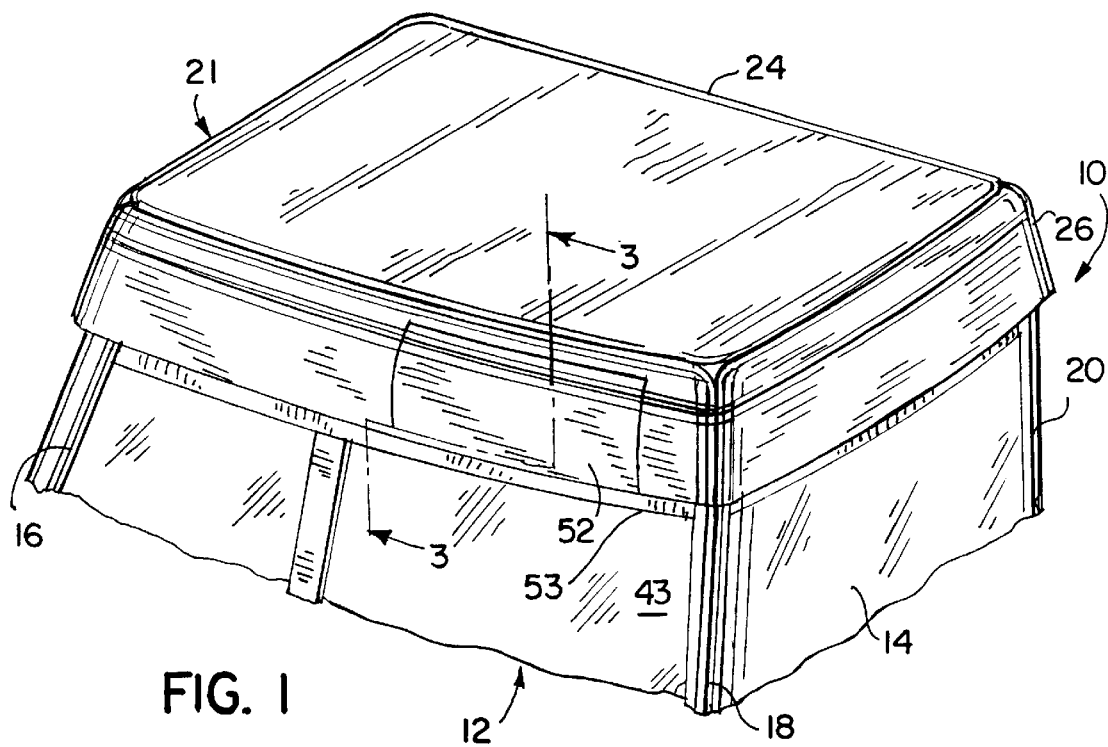
FIG. 1 is a perspective view of the top of a vehicle cab provided with an air handling system in accordance with this invention.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Referring to FIG. 1, the upper portion 10 of a cab of a work vehicle provided with an air handling system is shown. The sides of the cab 12, may be opaque walls, translucent windows, or more usually a combination of both, a portion of which may be in the form of openable or removable doors or windows. As shown, the back of the cab is provided with a window 14. The upper portion 10 of the cab is supported on four roll-over protection posts, three of which are shown as 16, 18 and 20.

Figure 2:
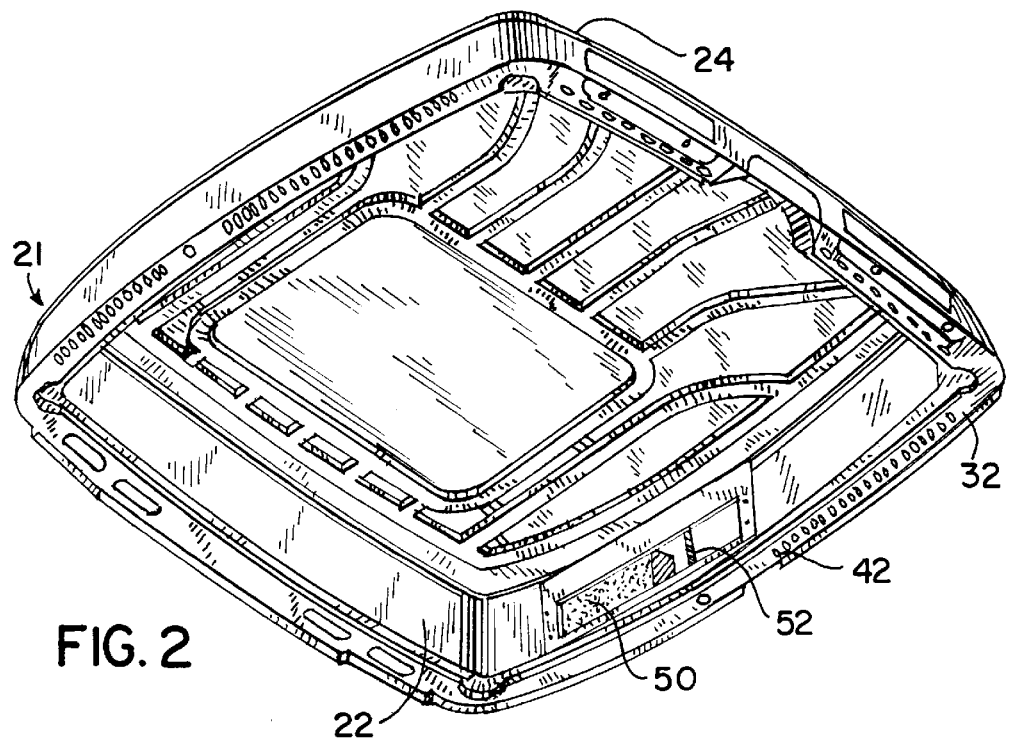
FIG. 2 is a perspective bottom view of the assembled inner and outer roof members used to form the roof of the vehicle cab as shown in FIG. 1.
Figure 3:
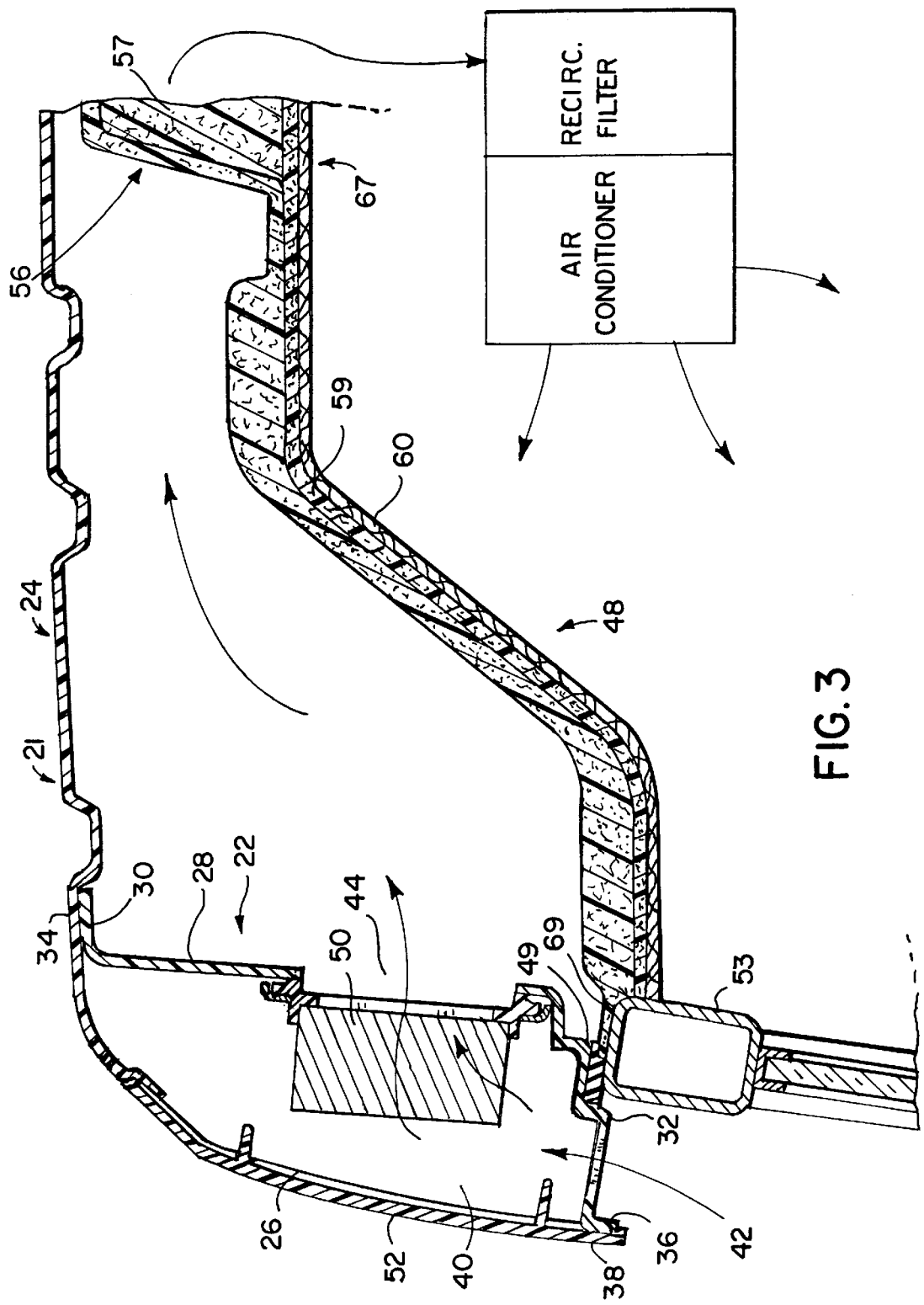
FIG. 3 is a cross-sectional view of the assembled inner and outer roof members taken along the line 3—3 in FIG. 1.

The cab roof 21 is formed of inner and outer members 22 and 24, respectively, as shown in FIGS. 2 and 3. The members 22 and 24, in a preferred embodiment, are molded from a high strength plastic. The outer member or shell 24 is provided with ribs or indentations to provide the desired rigidity to the cab roof 21. Further, the outer member 24 is formed with a bowl shape having a downwardly extending flange 26. The inner member 22 consists of a vertical portion 28 which encircles the cab, and upper and lower flanges 30 and 32, respectively, extending from the ends of the vertical portion 28. The upper flange 30 is secured to the inside surface of the outer member 24, such as by bonding, welding, heating, gluing, screwing or riveting at 34. The lower flange 32 has a downward turned end 36, which is secured to the inside surface of the lower end of flange 26 of the outer member 24 at 38. The seals formed between the inner member 22 and the outer member 24 by the secured portions at 34 and 38 forms a first chamber 40. Outside air may enter the chamber 40 which preferably extends around the complete periphery of roof 21 through slots 42 formed in the horizontal lower flange 32 of the inner member 22.

An opening 44 is formed in the vertical portion 28 of the inner member 22, through which air in the chamber 40 may pass through the inner member 22 to a second chamber 46, formed between the cab roof 21 and a headliner 48 of the cab. A filter 50 (e.g. foam, pleated paper, electrostatic, etc.) is provided over the opening 44 to filter the air from the first chamber 40 as it passes into the second chamber 46. Filter 50 is preferably a frameless, pleated paper filter. By employing a frameless, pleated paper filter, dust that gathers on the outer surface of the filter (that surface of the filter facing into chamber 40) can fall completely free of the filter. The filter preferably extends into chamber 40 such that dust falling from filter 50 will be contained in a lower portion of chamber 40 due to gravity. Alternatively, the filter can be cleaned by closing the door of the vehicle cab. When the door is closed, the resulting slight pressure increase in the cab will cause a back flow through the filter that will dislodge dust from the filter surface and cause it to fall away from the filter. Slots 42 as best seen in FIGS. 2 and 3 are preferably disposed away from filter 50 to prevent dust that is dislodged from filter 50 and falls downward in chamber 40 from also falling through slots 42 and onto window 43 disposed below filter 50. In this manner, chamber 40 will collect dislodged dust and the dust will not fall onto the cab windows. A door 52 is provided in the side wall or flange 26 of outer member 24 in alignment with filter 50 and opening 44, to provide access for servicing or replacing filter 50 from the outside of cab 10.

As shown in FIG. 3, the headliner 48 and the inner member 22 are supported on and secured to a tubular rectangular frame 53, preferably formed of metal, which is in turn supported by the roll-over protection posts 16–20 at each of its four corners. A flexible polymeric seal 49 is disposed about the top of frame 53 between cab roof 21 and frame 53. The seal preferably extends completely about the periphery of frame 53 to thereby provide a continuous air seal between frame 53 and roof 21.

Figure 4:
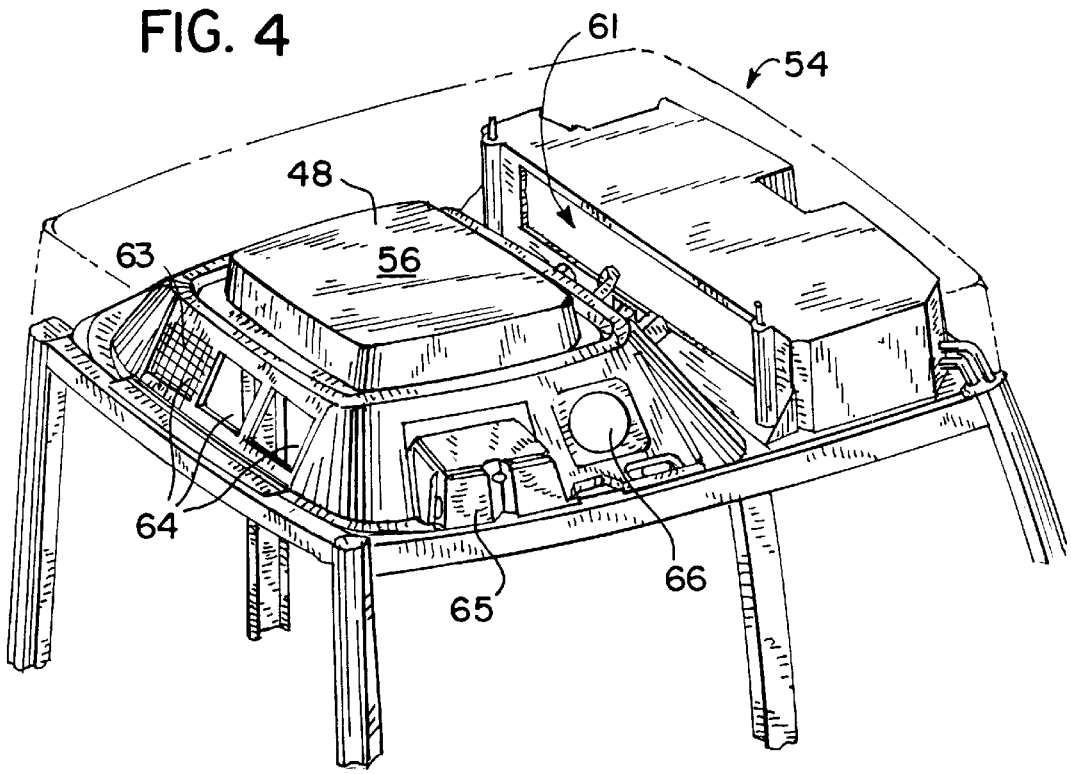
FIG. 4 is a perspective view of the vehicle cab of FIG. 1, with the roof members removed to show the top surface of the headliner and the air handling unit.

Referring to FIG. 4, the top of the headliner 48 and an air handling unit 54, which would be covered by the outer member 24 of the cab roof 21 (shown by dashed lines) in a fully assembled cab, are shown. The headliner 48, like the outer roof member 24 is of an inverted cup shape, having a portion 56, shown in FIGS. 3 and 4, which extends upward to help support the top of outer member 24. Headliner 48 is made of a cotton fiberglass substrate 51 whose inverted cup-shaped indentation is filled with acoustical foam 57. Headliner 48 includes a flange 69 at its periphery which engages and is supported by frame 53. The surface of headliner 48 facing the interior of the cab is covered by a thin foam skin 59 which, in turn, is covered by a fabric layer 60. Acoustical foam 57 preferably fills cup shaped recess 55 such that when then foam skin 59 is applied to headliner 48, a smooth top surface 67 of headliner 48 is formed.

Figure 5:
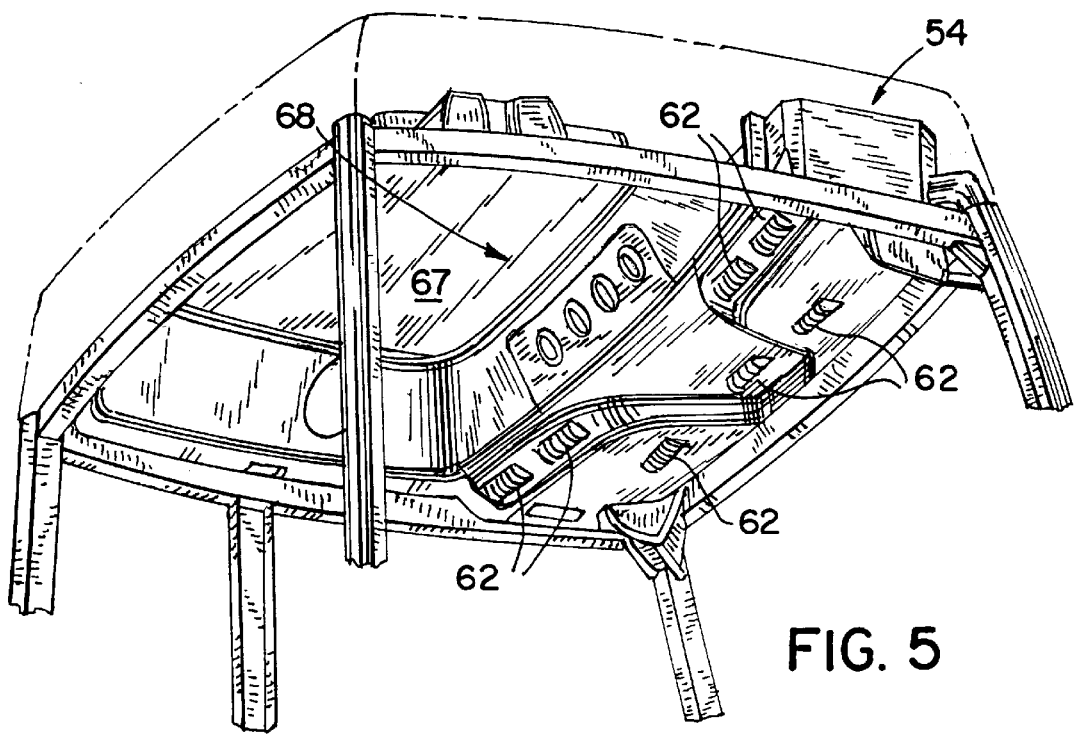
FIG. 5 is a perspective view of the vehicle cab of FIG. 1, showing the bottom, or inside surface of the headliner. (For clarity the side support posts have not been shown.)

Air which enters the second chamber 46 flows to the air handling unit 54 which is located between the cab roof 21 and the headliner 48. The air handling unit 54 operates to heat or cool the air at the option of the vehicle operator, and includes an air moving mechanism such as a blower. The blower draws air from the second chamber 46 into the air handling unit 54 through an opening 61. After the air has passed through the air handling unit 54, it is directed into the interior of the cab through the louvers 62 as shown in FIG. 5. Air in the cab may be recirculated through the air handling unit 54, by flowing through the openings 64 provided in the rear wall of the headliner 48. To further clean the air in the cab, a filter 63 may be placed in the second chamber 46 to cover the openings 64 (for clarity, only one such filter is shown).

Referring to FIGS. 4 and 5, in order to complete the description of the headliner, additional features will be briefly mentioned. The outward protrusion 65 is intended to accommodate a radio, with a speaker being mounted in each circular hole 66. The oval shaped controls 68 shown in the headliner in FIG. 5 are representative of controls made accessible to the operator, such as for the air heating and conditioning system.

While only one embodiment of the invention has been shown, it should be apparent to those skilled in the art that what has been described is considered at present to be a preferred embodiment of the air handling system of this invention for the cab of a vehicle. For example, a manually or electronically controlled damper could be incorporated into the system to control the flow of air from the outside of cab 10 into chamber 46. Accordingly, changes may be made in the air handling system without departing from the true spirit and scope of this invention. The appended claims are intended to cover all such changes and modification which fall in the true spirit and scope of this invention.

The embodiments of the invention in which an exclusive property or privilege is claimed are defined as follows:

1. An air handling system for the cab of a vehicle comprising:
   a cab roof including inner and outer roof members spaced from each other so as to form a first chamber therebetween, the cab roof having a first plurality of openings around its periphery through which air may be drawn into the first chamber;
   a headliner for the cab, the headliner and the cab roof forming a second chamber therebetween, the inner roof member having a first opening therein through which air in the first chamber may flow into the second chamber; and
   an air handling unit located between the headliner and the cab roof, the air handling unit receiving air from the second chamber and discharging it through a first opening in the headliner into the cab interior.

2. The air handling system of claim 1, further including an air filter positioned to filter air passing through the first opening in the inner roof member.

3. The air handling system of claim 1, wherein a second opening is provided in the headliner for recirculation of air from the cab interior to the second chamber.

4. The air handling system of claim 3, including an air filter positioned to filter air passing through the second opening in the headliner.

5. The air handling system of claim 1, wherein the air handling unit is a heating, ventilation and air conditioning unit.

6. The air handling system of claim 1, wherein the first plurality of openings in the cab roof are located on the bottom peripheral surface of the inner roof member, such that fresh air is drawn upward through the first plurality of openings into the first chamber.

7. The air handling system of claim 1, wherein the peripheries of the inner and outer roof members are formed with a flange, with the first plurality of openings being formed in the flange of the inner roof member.

8. The air handling system of claim 1, wherein the first opening in the headliner is generally located under the air handling unit.

9. The air handling system of claim 8, wherein the first opening in the headliner is provided with air directing louvers to control the direction of air flow into the cab.

10. An air handling system for the cab of a vehicle comprising:
    inner and outer roof members spaced from each other so as to form a first chamber therebetween, the inner roof member having a first plurality of openings around its periphery through which fresh air may be drawn into the first chamber;
    a headliner for the cab, the headliner and the inner roof member forming a second chamber therebetween, the inner roof member having a first opening therein through which fresh air in the first chamber may flow into the second chamber; and an air handling unit located between the headliner and the inner roof member, the air handling unit receiving air from the second chamber and discharging it through first openings in the headliner into the cab interior.

11. The air handling system of claim 10, further including an air filter positioned to filter fresh air passing through the first opening in the inner roof member.

12. The air handling system of claim 10, wherein a second opening is provided in the headliner for recirculation of air from the cab interior to the second chamber.

13. The air handling system of claim 12, further including an air filter positioned to filter air passing through the second opening in the headliner.

14. The air handling system of claim 10, wherein the air handling unit is a heating, ventilating, and air conditioning unit.

15. The air handling system of claim 10, wherein the first plurality of openings in the inner roof member are located on the bottom peripheral surface of the inner roof member, such that fresh air is drawn upward through the first plurality of openings into the first chamber.

16. The air handling system of claim 10, wherein the peripheries of the inner and outer roof members are formed with a flange, with the first plurality of openings being formed in the inner roof member.

17. The air handling system of claim 10, wherein the first openings in the headliner are generally located under the air handling unit.

18. The air handling system of claim 17, wherein the first openings in the headliner are provided with air directing louvers to control the direction of air flow into the cab interior.

19. A vehicle cab roof comprising:

a dished shaped roof section;

a wall fastened within the roof section to form a first chamber, wherein the roof section includes at least a first opening therein to provide a passage from the exterior of the roof section into the first chamber;

a headliner connected to the roof section and wall to form a second chamber between the headliner, the roof section and the wall, wherein the wall includes at least a second opening therein to provide a passage from the first chamber into the second chamber; and a blower assembly in fluid communication with the second chamber to draw air from the exterior of the roof into the second chamber through the first opening, the first chamber and the second opening.

20. The roof of claim 19 further comprising a filter covering the second opening to filter air passing from the first chamber to the second chamber.

21. The roof of claim 20, wherein the headliner includes at least a third opening and the blower draws air through the third opening into the second chamber.

22. The roof of claim 21, wherein the roof section includes an access opening configured to permit installation and removal of the filter from the exterior of the roof.

23. The roof of claim 22, further comprising a cover fastened over the access opening.

24. The roof of claim 23, wherein the filter is located substantially within the first chamber.

25. A vehicle cab comprising:

an enclosure for a vehicle operator defined by a support frame, a plurality of windows attached to the frame, and a headliner supported by the frame;

a dished shaped roof section supported by the frame and including a first chamber formed about the periphery thereof substantially adjacent to the frame, the roof section including at least a first opening therein to provide a passage from the exterior of the roof section into the first chamber, wherein the headliner is supported to form a second chamber between the headliner and the roof section, and the roof section includes at least a second opening therein to provide a passage from the first chamber into the second chamber; and a blower assembly in fluid communication with the second chamber to draw air from the exterior of the roof into the second chamber through the first opening, the first chamber and the second chamber.

26. The cab of claim 25 further comprising a filter supported over the second opening to filter air passing from the first chamber to the second chamber.

27. The cab of claim 26, wherein the headliner includes at least a third opening and the blower draws air through the third opening into the second chamber.

28. The cab of claim 27, wherein the roof section includes an access opening configured to permit installation and removal of the filter from the exterior of the roof.

29. The cab of claim 28, further comprising a cover fastened over the access opening.

30. The cab of claim 26, wherein the filter is a frameless pleated filter with vertically oriented pleats.

31. The cab of claim 30, wherein the filter is disposed substantially within the first chamber and wherein the first opening is not disposed underneath the filter.

* * * * *